United States Patent

[11] 3,584,301

[72] Inventor Donald E. Tomaszewski
Kokomo, Ind.
[21] Appl. No. 801,414
[22] Filed Feb. 24, 1969
[45] Patented June 8, 1971
[73] Assignee General Motors Corporation
Detroit, Mich.

[54] RADIO TRANSCEIVER
5 Claims, 1 Drawing Fig.

[52] U.S. Cl. .......... 325/21, 343/175
[51] Int. Cl. .......... H04b 1/40
[50] Field of Search .......... 325/16, 21, 22, 23; 343/175, 176, 178, 180, 181

[56] References Cited

UNITED STATES PATENTS

| | | | |
|---|---|---|---|
| 2,369,193 | 2/1945 | Vrooman | 325/21 |
| 2,939,949 | 6/1960 | Curtis | 325/21X |
| 3,112,445 | 11/1963 | Holden et al. | 325/21X |

*Primary Examiner*—Robert L. Griffin
*Assistant Examiner*—R. S. Bell
*Attorneys*—C. R. Meland, E. W. Christen and Tim G Tagodizinski

ABSTRACT: A radio transceiver comprises a transmitter having an output circuit for transmitting signal information and a receiver having an input circuit for receiving signal information. An antenna is connected to the output circuit of the transmitter and to the input circuit of the receiver. A switching device is connected in series within the output circuit of the transmitter and in parallel across the input circuit of the receiver. When in one operative condition, the switching device enables the output circuit of the transmitter to transmit signal information to the antenna by short circuiting the input circuit of the receiver to disable the receiver. When in another operative condition, the switching device enables the input circuit of the receiver to receive signal information from the transmitter by open circuiting the output circuit of the transmitter to disable the transmitter.

PATENTED JUN 8 1971 3,584,301
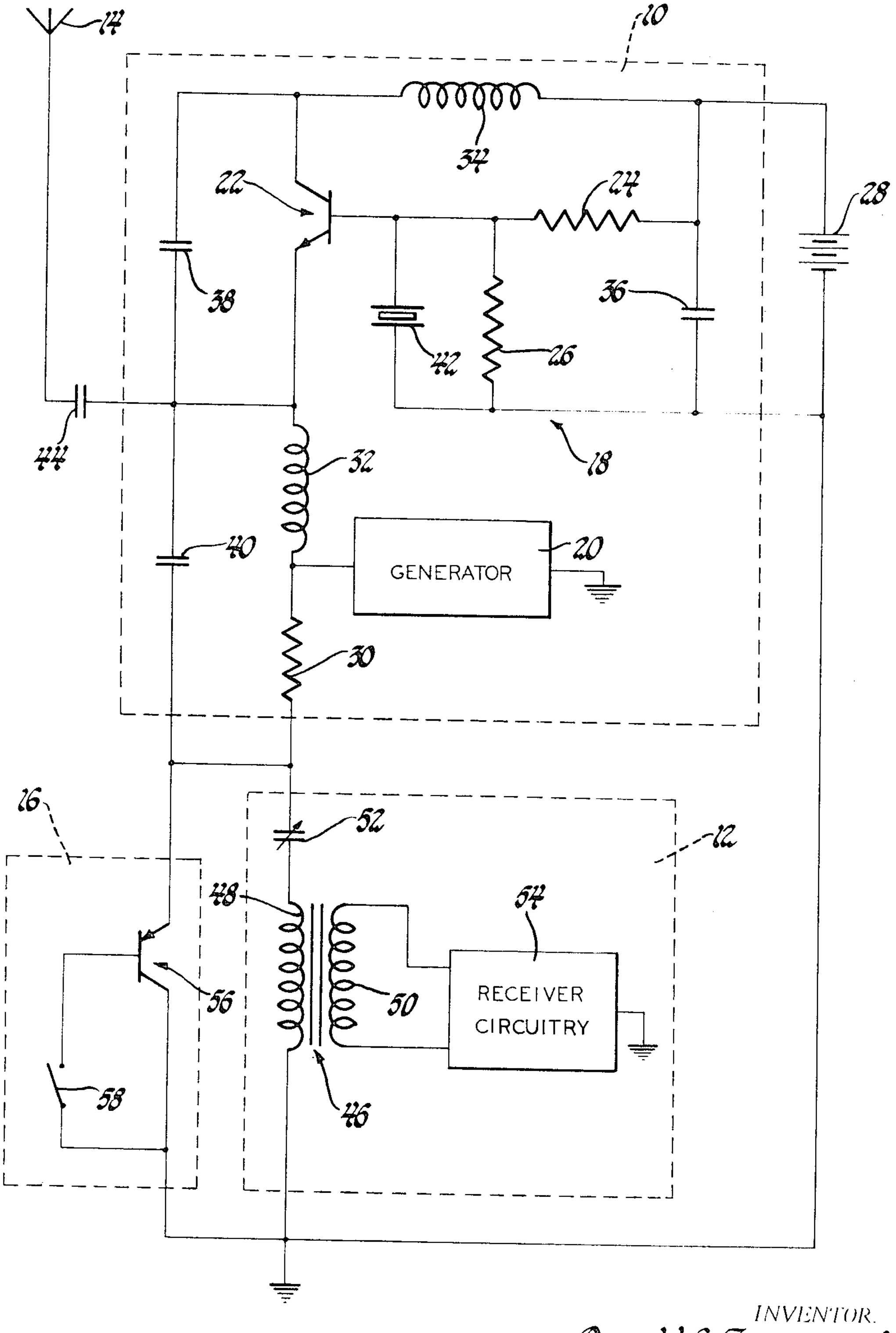
INVENTOR.
Donald E. Tomaszewski
BY
C. R. Meland
ATTORNEY

RADIO TRANSCEIVER

This invention relates to a radio transceiver, or more specifically, to a combination radio transmitter and radio receiver.

A radio transceiver is a communications apparatus for transmitting and receiving radio signals, usually in the citizens frequency band. Ordinarily, a radio transceiver includes a transmitter and a receiver which share a single antenna. Consequently, when it is desired to transmit, the antenna must be connected to the transmitter and disconnected from the receiver. Conversely, when it is desired to receive, the antenna must be connected to the receiver and disconnected from the transmitter. The present invention proposes a radio transceiver wherein the antenna may be conveniently and efficiently switched between the transmitter and the receiver.

According to one aspect of the invention, the antenna is permanently connected to both the transmitter and the receiver. Further, a switching device having a conductive condition and a nonconductive condition is connected to the transmitter and the receiver. The switching device is operative during one condition of conductivity to disable the transmitter and enable the receiver thereby to effectively connect the antenna to the receiver only, and is operative during the other condition of conductivity to disable the receiver and enable the transmitter thereby to effectively connect the antenna to the transmitter only.

In another aspect of the invention, the transmitter includes an oscillator having a tuned circuit, and the receiver includes an input transformer having a primary winding connected with the tuned circuit of the oscillator. The antenna is directly connected to the oscillator and is indirectly connected to the primary winding of the input transformer through the tuned circuit of the oscillator. The switching device is connected in the tuned circuit of the oscillator and across the primary winding of the input transformer. When the switching device is opened, the tuned circuit of the oscillator is open circuited so as to disable the transmitter and enable the receiver thereby to effectively connect the antenna through the tuned circuit to the primary winding of the input transformer. When the switching device is closed, the primary winding of the input transformer is short circuited so as to disable the receiver and enable the transmitter thereby to effectively connect the antenna directly to the oscillator.

In a further aspect of the invention, the oscillator includes an amplifier device connected to a bias circuit and to the tuned circuit. The tuned circuit includes a tuning capacitor. The antenna is connected directly to the amplifier device and indirectly to the primary winding of the input transformer through the tuning capacitor in the tuned circuit. The switching device includes a switching transistor which is connected in series within the bias circuit and the tuned circuit, and in parallel across the primary winding of the input transformer. When it is desired to receive signal information, the switching transistor is rendered relatively nonconductive to open circuit the tuned circuit and the bias circuit of the oscillator thereby to effectively connect the antenna through the tuning capacitor to the primary winding of the input transformer. When it is desired to transmit signal information, the switching transistor is rendered relatively conductive to short circuit the primary winding of the input transformer thereby to effectively connect the antenna directly to the amplifier device of the oscillator.

The invention may be best understood by reference to the following detailed description of a preferred embodiment when considered in conjunction with the accompanying drawing which is a schematic diagram of a radio transceiver incorporating the principles of the invention.

Referring to the drawing, the illustrated radio transceiver includes a transmitter 10 for generating modulated radio signals and a receiver 12 for demodulating modulated radio signals. An antenna 14 is directly connected to the transmitter 10 and is indirectly connected to the receiver 12 through a portion of the transmitter 10. The antenna 14 accepts modulated radio signals from the transmitter 10 and radiates them into the surrounding medium, and receives modulated radio signals from the surrounding medium and couples them to the receiver 12. A switching device 16 having an opened condition and a closed condition is connected to the transmitter 10 and across the receiver 12. In the opened condition, the switching device 16 is operative to open circuit the transmitter 10 thereby to effectively connect the antenna 14 to the receiver 12 for receiving modulated radio signals. In the closed condition, the switching device 16 is operative to short circuit the receiver 12 thereby to effectively connect the antenna to the transmitter 10 for transmitting modulated radio signals.

The transmitter 10 includes an oscillator 18 for producing a radio frequency carrier signal and a generator 20 for producing an audiofrequency intelligence signal. The generator 20 is connected to the oscillator 18 so as to amplitude modulate the radio frequency carrier signal with the audiofrequency intelligence signal thereby to develop an amplitude modulated radio signal. The generator 20 may be any suitable apparatus capable of producing an audiofrequency intelligence signal to be transmitted, as for example an audio pickup and amplifier device.

The oscillator 18 is a conventional Collpitt's crystal oscillator. It includes an amplifying component provided by a conventional junction transistor 22 having base, emitter and collector electrodes. The oscillator 18 also comprises a bias circuit including biasing resistors 24 and 26 connected in series between the positive side of a DC voltage source 28 and ground. The DC voltage source 28 may be conveniently provided by a battery. The base electrode of the transistor 22 is connected to the junction between the resistors 24 and 26. The bias circuit also includes a biasing resistor 30 and a choke coil 32 connected in series between the emitter electrode of the transistor 22 and the switching device 16.

The oscillator 18 further comprises a tuned circuit including a tuning coil 34 connected in series with a bypass capacitor 36 between the collector electrode of the transistor 22 and ground, a first tuning capacitor 38 connected between the collector and emitter electrodes of the transistor 22, and a second tuning capacitor 40 connected between the emitter electrode of the transistor 22 and the switching device 16. The tuned circuit also includes a piezoelectric crystal 42 connected between the base electrode of the transistor 22 and ground. The piezoelectric crystal 42 may conveniently take the form of a quartz crystal. The tuned circuit of the oscillator 18 forms the output circuit of the transmitter 10.

The antenna 14 is permanently connected through a coupling capacitor 44 to the emitter electrode of the transistor 22 in the oscillator 18. The output of the generator 20 is connected to the oscillator 18 between the biasing resistor 30 and the choke coil 32 in the bias circuit.

The receiver 12 includes an input transformer 46 having a primary winding 48 and a secondary winding 50. The primary winding 48 is connected in series with the second tuning capacitor 40 in the tuned circuit and in series with the biasing resistor 30 in the bias circuit through a variable trimmer capacitor 52. The secondary winding 50 is connected to receiver circuitry 54 which includes the remaining portions of the receiver 12. Preferably, the receiver 12 is a conventional tuned frequency receiver. The primary winding 48 of the input transformer 46 and the trimmer capacitor 52 form the input circuit of the receiver 12.

The switching device 16 includes a conventional junction transistor 56 having base, emitter and collector electrodes. The emitter electrode of the transistor 56 is connected in series with the second tuning capacitor 40 in the tuned circuit and the biasing resistor 40 in the bias circuit. The collector electrode of the transistor 56 is connected directly to ground. Thus, the switching transistor 56 is effectively connected in series within the tuned circuit and the bias circuit of the oscillator 18 and connected in parallel across the trimmer capacitor 52 and the primary winding 48 of the input transformer 46. Put another way, the switching transistor 56 is connected in series with the output circuit of the transmitter 10 and in parallel with the input circuit of the receiver 12. A manually operable control switch 58 is connected between the base and collector electrodes of the transistor 56 for controlling the relative conductivity of the transistor 56.

In operation, when the control switch 58 is closed, the switching transistor 56 is turned on or rendered fully conductive. In the fully conductive state, the transistor 56 acts as a short circuit. Consequently, the transistor 56 effectively connects the second tuning capacitor 40 in the tuned circuit and the biasing resistor 30 in the bias circuit to ground thereby to enable the oscillator 18 or render it operative. In addition, the transistor 56 places a short circuit across the trimmer capacitor 52 and the primary winding 48 of the input transformer 46 so as to disable the input transformer 46 or render it inoperative. Thus, the antenna 14 is effectively coupled to the oscillator 18 of the transmitter 10 and is effectively decoupled from the input transformer 46 of the receiver 12.

In the oscillator 18 the bias circuit formed by the biasing resistors 24, 26 and 30 establishes a DC bias voltage across the base and emitter electrodes of the transistor 22 thereby to establish the operating point of the transistor 22 and render it conductive. Preferably, the transistor 22 is biased to provide Class C amplifier operation. The tuned circuit formed by the tuning coil 34, the first and second tuning capacitors 38 and 40, and the piezoelectric crystal 42 places the transistor 22 in oscillation so as to produce a radio frequency carrier signal at the emitter electrode. The piezoelectric crystal 42 defines the resonant frequency of the tuned circuit thereby to determine the frequency of the radio frequency signal produced by the oscillator 18.

The generator 20 applies the audiofrequency intelligence signal across the biasing resistor 30 so as to correspondingly vary the bias voltage across the base and emitter electrodes of the transistor 22 thereby to amplitude modulate the radio frequency carrier signal with the audiofrequency intelligence signal. The resultant amplitude modulated radio signal appears at the emitter electrode of the transistor 22. This modulated radio signal is coupled through the capacitor 44 to the antenna 16 from which it is radiated into the surrounding medium.

The bypass capacitor 36 in the tuned circuit shunts radio frequency signals across the biasing resistors 24 and 26 so as to prevent the radio frequency signals from influencing the bias voltage on the transistor 22. Conversely, the choke coil 32 in the biasing circuit blocks radio frequency signals from feeding into the generator 20 so as to prevent the radio frequency signals from distorting the audiofrequency signals produced by the generator 20. However, the choke coil 32 passes audiofrequency signals so as to assure proper modulation of the radio frequency signal produced by the oscillator 18.

When the control switch 58 is opened, the switching transistor 56 is turned off or rendered fully nonconductive. In the fully nonconductive state, the transistor 56 acts as an open circuit. Consequently, the transistor 56 places an open circuit across the trimmer capacitor 52 and the primary winding 48 of the input transformer 46 thereby to enable the input transformer 46 or render it operative. In addition, the transistor 56 effectively disconnects the second tuning capacitor 40 in the tuned circuit and the biasing resistor 30 in the biasing circuit from ground so as to disable the oscillator 18 or render it inoperative. Thus, the antenna 14 is effectively coupled through the second tuning capacitor 40 to the input transformer 46 of the receiver 12 and is effectively decoupled from the oscillator 18 of the transmitter 10. The trimmer capacitor 52 is adjusted so as to tune the primary winding 48 of the input transformer 46 to the frequency of the modulated radio signal to be received by the antenna 14. These modulated radio signals are received by the antenna 14 and coupled to the primary winding 48 of the input transformer 46 through the coupling capacitor 44, the second tuning capacitor 40 and the trimmer capacitor 52.

In the receiver 12, the modulated radio signals are transferred across the input transformer 46 from the primary winding 48 to the secondary winding 50 which applies them to the tuned frequency receiver circuitry 54. Typically, the modulated radio signals are amplified and demodulated in the receiver circuitry 54 so as to recover the audiofrequency intelligence signal which is then amplified and applied to an audio output device such as a speaker.

In a radio transceiver constructed in accordance with the preferred embodiment of the invention, the following circuit components and values were found to yield satisfactory results:

| | |
|---|---|
| Transistor 22 | PT886 TRW |
| Transistor 56 | DS36 Delco Radio |
| Resistor 24 | 2200 ohms |
| Resistor 26 | 1000 ohms |
| 30 | 150 ohms |
| Capacitor 36 | 0.002 microfarads |
| Capacitor 38 | 47 picofarads |
| Capacitor 40 | 180 picofarads |
| Capacitor 44 | 910 picofarads |
| Capacitor 52 | 30 picofarads |
| Inductor 32 | 51 microhenries |

It is to be understood that the oscillator 18 need not be a Collpitt's crystal oscillator, but may be any suitable oscillator having a tuning capacitor 40 through which the antenna 14 may be indirectly connected to the primary winding 48 of the input transformer 46. Similarly, the amplifying component of the oscillator 18 need not be a junction transistor 22 but may be a field effect transistor, a vacuum tube, or any other suitable amplifier device. Likewise, the switching device 16 need not include a junction transistor 56 but may utilize any suitable switching element such as a field effect transistor, a vacuum tube, a silicon controlled rectifier, or a silicon controlled switch. Further, although the amplifying transistor 22 is illustrated as being of the NPN conductivity type and the switching transistor 56 is illustrated as being of the PNP conductivity type, it is to be noted that the amplifying transistor 22 and the switching transistor 56 may each be of the opposite conductivity type from that shown.

It will now be readily apparent that one particularly advantageous application of the invention is in a citizens band radio transceiver such as the familiar walkie-talkie. Another advantageous application of the invention is in an automotive vehicle to supplement or replace the conventional vehicle horn. In the latter application, the generator 20 may be provided by a tone signal source operated by the vehicle horn button which may serve as the control switch 56. The antenna 14 may be provided by the conventional vehicle radio antenna and the audio output device of the receiver circuitry 54 may be provided by the conventional vehicle radio speaker. Thus, when the horn button is released, audiofrequency tone signals may be received from other automotive vehicles in the vicinity so as to energize the vehicle radio speaker to produce a warning signal. Conversely, when the vehicle horn button is depressed, an audio frequency tone signal may be transmitted from the antenna 14 to other automotive vehicles in the vicinity.

What I claim is:

1. A radio transceiver apparatus, comprising: a transmitter for transmitting modulated radio signals; a receiver for receiving modulated radio signals; an antenna connected to the transmitter for radiating modulated radio signals coupled from the transmitter and connected to the receiver through a reactive portion of the transmitter for coupling received modulated radio signals to the receiver; and switching means connected to the transmitter and to the receiver and selectively operable for open circuiting the transmitter thereby to disable the transmitter and effectively connect the antenna through the reactive portion of the transmitter to the receiver, and for short circuiting the receiver thereby to disable the receiver and effectively connect the antenna to the transmitter.

2. A radio transceiver apparatus, comprising: a transmitter having an output circuit for transmitting signal information; a receiver having an input circuit for receiving signal information; an antenna connected to the output circuit of the transmitter for transmitting signal information transferred to the antenna from the output circuit, and connected to the input circuit of the receiver through a capacitive portion of the output circuit of the transmitter for transferring signal information received by the antenna to the input circuit; switching means having a conductive condition and a nonconductive condition connected in series with the output circuit of the transmitter and in parallel across the input circuit of the receiver, so that in the conductive condition the switching means enables the output circuit of the transmitter to transmit signal information to the antenna by short circuiting the input circuit of the receiver to disable the receiver, and so that in the nonconductive condition the switching means enables the input circuit of the receiver to receive signal information from the antenna through the capacitive portion of the output circuit of the transmitter by open circuiting the output circuit of the transmitter to disable the transmitter.

3. A radio transceiver apparatus, comprising: a transmitter including an oscillator for producing a radio frequency carrier signal which is modulated by an audiofrequency intelligence signal applied to the oscillator, the oscillator including a tuned circuit for determining the frequency of the radio frequency carrier signal; a receiver including an input transformer having a primary winding connected in series with the tuned circuit of the oscillator; an antenna connected to the oscillator for radiating modulated radio signals developed by the transmitter and coupled to the antenna, and connected to the primary winding of the input transformer through a portion of the tuned circuit of the oscillator for coupling modulated radio signals received by the antenna to the primary winding of the input transformer; and switching means connected within the tuned circuit of the oscillator for disabling the transmitter by open circuiting the tuned circuit when the switching means is opened thereby to effectively connect the antenna through the portion of the tuned circuit to the primary winding of the input transformer, and the switching means also connected across the primary winding of the input transformer for disabling the receiver by short circuiting the primary winding of the input transformer when the switching means is closed thereby to effectively connect the antenna to the oscillator.

4. In combination: a transmitter comprising an amplifier device, a bias circuit connected to the amplifier device for establishing the operating point of the amplifier device, a tuned circuit including a tuning capacitor connected to the amplifier device for placing the amplifier device in oscillation so as to produce a radio frequency carrier signal, and generator means connected to the amplifier device for applying an audiofrequency intelligence signal to the amplifier device thereby to amplitude modulate the carrier signal with the intelligence signal so as to obtain an amplitude modulated radio signal; a receiver including an input transformer having a primary winding connected in the bias circuit and to the tuning capacitor in the tuned circuit; an antenna connected to the amplifier device for radiating modulated radio signals coupled from the amplifier device, and connected to the primary winding of the input transformer through the tuning capacitor in the tuned circuit for coupling received modulated signals to the primary winding of the input transformer; and switching means connected in the bias circuit and in the tuned circuit for rendering the transmitter inoperative by open circuiting the bias circuit and the tuned circuit when the switching means is opened thereby to effectively connect the antenna through the tuning capacitor in the tuned circuit to the primary winding of the input transformer, and the switching means also connected across the primary winding of the input transformer for rendering the receiver inoperative by short circuiting the primary winding of the input transformer when the switching means is closed thereby to effectively connect the antenna to the amplifier device.

5. In combination: a radio transmitter comprising an amplifying transistor, a bias circuit connected to the amplifying transistor for establishing the operating point of the amplifying transistor, a tuned circuit including a tuning capacitor connected to the amplifying transistor for placing the amplifying transistor in operation so as to produce a radio frequency carrier signal, and generator means connected to the amplifying transistor for applying an audiofrequency intelligence signal to the amplifying transistor thereby to amplitude modulate the carrier signal with the intelligence signal so as to obtain an amplitude modulated radio signal; a receiver including an input transformer having a primary winding connected in the bias circuit and to the tuning capacitor in the tuned circuit; an antenna connected to the amplifying transistor for radiating modulated radio signals coupled from the amplifying transistor, and connected to the primary winding of the input transformer through the tuning capacitor in the tuned circuit for coupling received modulated radio signals to the primary winding of the input transformer; and switching means including a switching transistor connected in series within the bias circuit and the tuned circuit and connected in parallel across the primary winding of the input transformer, the switching means further including a manually operable switch connected to the switching transistor for rendering the switching transistor nonconductive to open the bias circuit and the tuned circuit thereby to effectively connect the antenna through the tuning capacitor in the tuned circuit to the primary winding of the input transformer, and for rendering the switching transistor conductive to short the primary winding of the input transformer thereby to effectively connect the antenna to the amplifying transistor.